H. A. LINES.
ELECTRIC SIGNAL MECHANISM FOR OVERHEAD TROLLEY SYSTEMS.
APPLICATION FILED DEC. 23, 1908.
924,800.
Patented June 15, 1909.
2 SHEETS—SHEET 1.
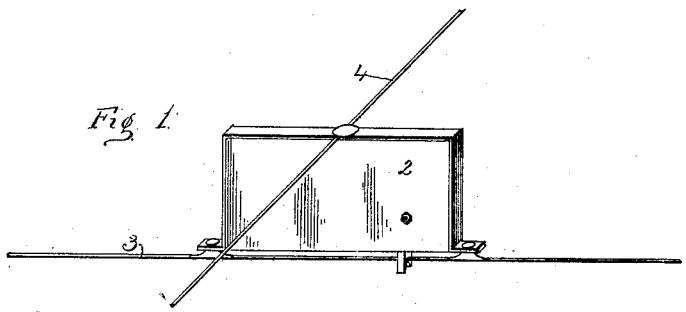
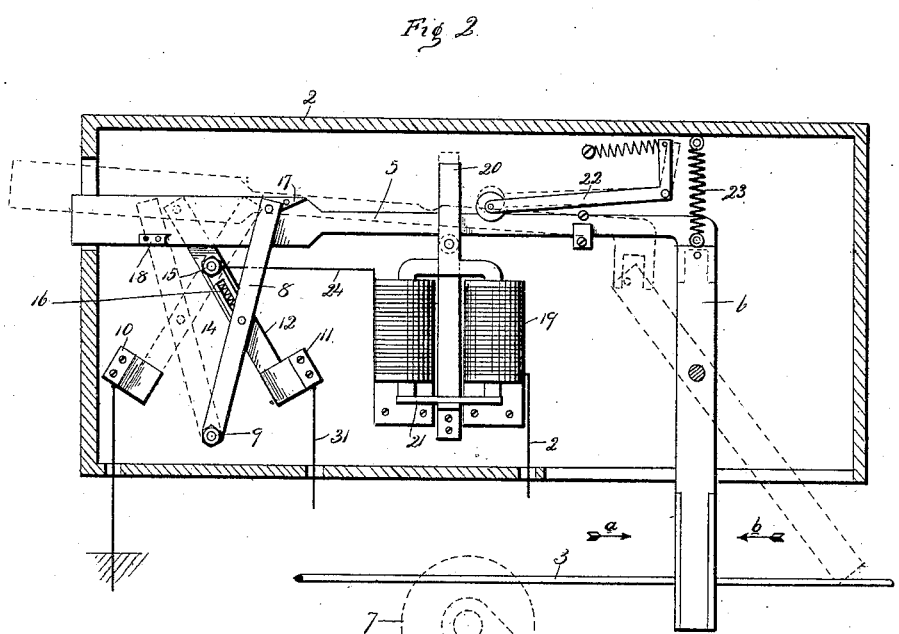
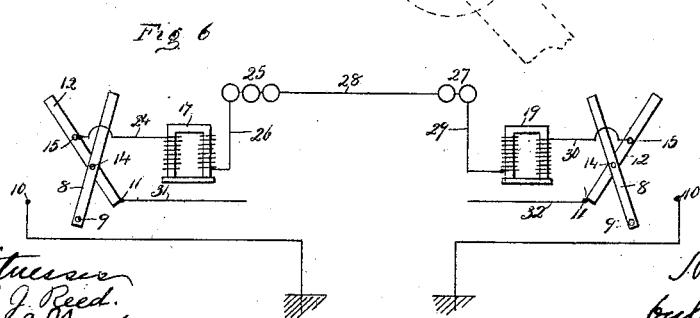
THE NORRIS PETERS CO., WASHINGTON, D. C.

H. A. LINES.
ELECTRIC SIGNAL MECHANISM FOR OVERHEAD TROLLEY SYSTEMS.
APPLICATION FILED DEC. 23, 1908.

924,800.

Patented June 15, 1909.

UNITED STATES PATENT OFFICE.

HAROLD A. LINES, OF WEST HAVEN, CONNECTICUT.

ELECTRIC SIGNAL MECHANISM FOR OVERHEAD-TROLLEY SYSTEMS.

No. 924,800.  Specification of Letters Patent.  Patented June 15, 1909.

Application filed December 23, 1908. Serial No. 468,907.

*To all whom it may concern:*

Be it known that I, HAROLD A. LINES, a citizen of the United States, residing at West Haven, in the county of New Haven and State of Connecticut, have invented a new and useful Improvement in Electric Signal Mechanism for Overhead - Trolley Systems; and I do hereby declare the following, when taken in connection with the accompanying drawings and the numerals of reference marked thereon, to be a full, clear, and exact description of the same, and which said drawings constitute part of this specification, and represent, in—

Figure 3:
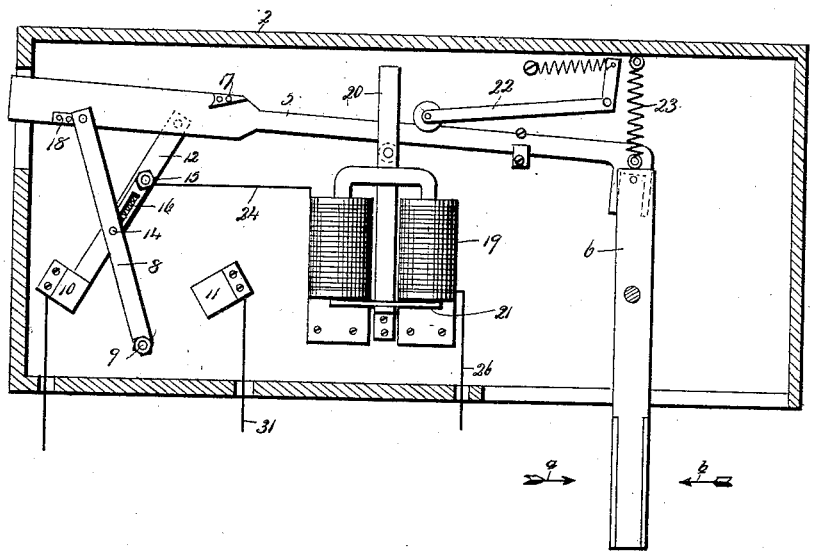
Figure 4:
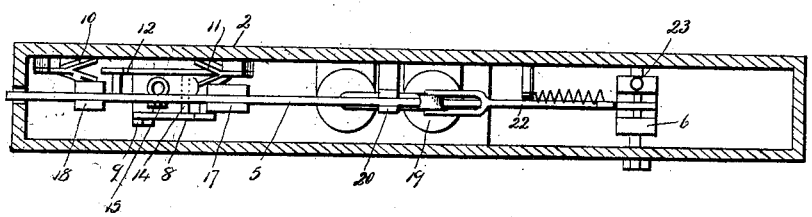
Figure 5:
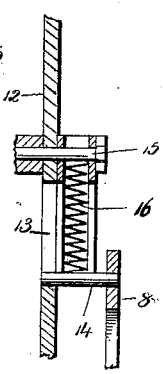

Figure 1 a perspective view of an electric signal mechanism for over-head trolleys shown as connected with a trolley and supported by the span wire. Fig. 2 a sectional elevation. Fig. 3 a similar view of the parts when the lights are thrown on. Fig. 4 a longitudinal sectional view. Fig. 5 an enlarged sectional view showing the connection between the contact link and its operating link. Fig. 6 a diagrammatic view showing the electric circuits.

This invention relates to an improvement in electric signal mechanism for overhead signals and particularly to mechanism for throwing lights on or off at the ends of a block by the passing of a trolley car, the object being a simple arrangement of parts which are operated mechanically to make positive contact; to avoid the danger of burning contacts; to assure the relighting of a signal following the renewal of power after a blow-out; and mechanism which permits of a car backing out of a block and resetting the signal lights; and the invention consists in the construction and arrangement of parts hereinafter described and particularly recited in the claims.

My improved mechanism is mounted in a suitable casing 2 secured to a trolley wire 3 and supported by the over-head span-wire 4. Within the box is a longitudinally movable lever 5 connected with an arm 6 pivoted in the case and extending down over the trolley wire 3 into the path of the trolley wheel 7. Pivotally connected with the lever 5 is a link 8 mounted on a stud 9 midway between the contact-finger 10 and the contact-finger 11, the contact-finger 10 leading to the ground and the contact-finger 11 to the trolley-wire. Pivoted in the case is a contact-link 12 adapted to engage with either contact points 10 or 11. This contact link 12 is formed with a recess 13 through which a pin 14 carried by the link 8 extends and between the pin 14 and the rivet 15 on which the contact link 12 is mounted on a spiral spring 16. On the arm 5 at the upper edge is a block or projection 17 and at the lower edge near the outer end is a corresponding block 18. Within the case is a coiled magnet 19 having an arm 20 connected with an armature 21 and extending up into the path of the lever 5 which rests upon it. To normally force the lever 5 downward, a spring-operated bell-crank 22 is employed, and to return the inner end of the arm a coil spring 23 may be used.

Starting with the position shown in Fig. 2 of the drawings, when a car enters the block (in the direction of the arrow *a*), the trolley wheel 7 will engage with the arm 6 and throw the lever 5. In this movement of the lever the block 17 will engage with the upper end of the link 8 and move it on its pivot 9. This movement of the link 8 moves the contact link 12 and turns its lower end from the contact-finger 11 to the contact-finger 10 and turns on the lights at both ends of the block. At the same time the magnet 19 is energized and the armature 21 raised, which raises the arm 20 and lifts the lever 5 as shown in broken lines in Fig. 2 and as shown in Fig. 3. This lifts the block 17 out of the path of the levers and so that another car entering the block from the same direction will not affect the lights, it being the custom when there are one or more cars following, the head car carries some indicating signal to that effect. If, however, with the lights as set, a work car should enter the block, it will not affect the signal as the movement of the arm 6 by the inwardly moving car will not change the switches as the lever 5 will freely move above them and if the car backs out of the block it will not change the signal lights as the lever will be out of the path of the switch. If a car, for instance, a work car, should enter the block it will set the signals as before described. Then when repairs are completed, instead of necessarily going to the end of the block in order to reset the signals, it may be backed out of the block, and moving in the direction of the arrow *b* will turn the arm 6 in the opposite direction, and when the lights are set the block 18 is in the path of the upper end of the link 8 and so that when the lever 5 is drawn inward this block 18 will engage with the upper end of the link 8 and throw it to its previous position, and therefore turn the contact link 12 from the contact finger 10 to the contact finger 11, or into the normal position. It will be understood that the signal mechanism is arranged at each end of the block so that a car entering the block will throw the lights on, and as it passes out of the block will turn the lights off.

The circuits are as follows:—One of the contact links 12 is connected by a wire 24 to its adjacent magnet 19, from the magnet to the light 25 by a wire 26, from the light 25 to the light 27 by a wire 28, from the light 27 to the other magnet 19 by a wire 29, from the magnet 19 to the other contact link 12 by a wire 30, the ends of the contact links 12 being connected respectively through the contact fingers 11 by wires 31, 32, with the trolley wire. The function of the spring 16 in the contact link 12 is to hold the end of the contact link in close engagement with the contact fingers 10 and 11. As shown in the diagram of Fig. 6 the lights are turned off, but a car moving into the block in either direction will turn them on for the reason that a car moving in the direction of the arrow $a$ will turn the contact link 12 to the contact finger 10, and hence ground the wire and complete the circuit, turning on the lights. Or if a car enters the other end of the block from the direction of the arrow $b$, the link 12 will be thrown into its contact with the ground, and thus close the circuit from that end. Thus the lights can be thrown in by a car entering the one end of the block and be thrown out when a car passes out of the block. A car entering the block from the direction of the arrow $a$ will throw on the lights and turn the link 8 into the path of the block 18 on the lever 5. As the car passes out of the block the lights will be extinguished and the armature in the first box dropped. The lights being out, a second car may enter the block in the direction of the arrow $a$ and moving the lever 5 will cause the block 17 to engage with the upper end of the contact link 12 and so reverse the position of that link and throw the lights on, it being understood that the connections form a three-way switch so that any change in the connections at either end will make a change in the lights.

I claim:—

1. An electric signal mechanism for overhead trolley systems comprising a box, a longitudinally movable lever, an arm connected therewith and extending into the path of a trolley wheel, said lever provided with blocks, a link pivoted in the case and extending into the path of said blocks, a contact link pivoted in the case and pivotally connected with said link, contact fingers with which said contact link may engage, a magnet, an armature actuated thereby, and connection between the lever and armature, whereby when the armature is raised, the lever will be lifted, substantially as described.

2. An electric signal mechanism for overhead trolley systems comprising a box, a longitudinally movable lever, an arm connected therewith and extending into the path of a trolley wheel, said lever provided with blocks, a link pivoted in the case and extending into the path of said blocks, a contact link pivoted in the case formed with a slot, a pin on said lever extending into said slot, a spring bearing on said pin, contact fingers with which said contact lever may engage, a magnet, an armature, connection between the armature and said lever for holding said lever out of the path of said links, substantially as described.

3. An electric signal mechanism for overhead trolley systems comprising a box adapted to be mounted on a trolley wire, a longitudinally movable lever within said box, an arm pivoted in the box and engaged with said lever and extending into the path of the trolley wheel, said lever formed with blocks, a link pivoted to the case and extending into the path of the said blocks, a contact link pivoted in the case and coupled with said link, contact fingers with which the contact link may engage, a spring-actuated bell-crank lever bearing on the upper end of said longitudinally movable lever, a magnet, an armature raised by said magnet and connected with said lever, whereby the lever may be lifted out of the path of said links, electric connections with signal lights, whereby the lights may be turned off or on by the movement of said lever, substantially as described.

In testimony whereof, I have signed this specification in the presence of two subscribing witnesses.

HAROLD A. LINES.

Witnesses:
FREDERIC C. EARLE,
CLARA L. WEED.